United States Patent
Mouthaan et al.

(10) Patent No.: US 10,197,407 B2
(45) Date of Patent: Feb. 5, 2019

(54) METHOD AND ROBOT SYSTEM FOR AUTONOMOUS CONTROL OF A VEHICLE

(71) Applicant: Precision Makers B.V., Giessen (NL)

(72) Inventors: Pieter Bastiaan Mouthaan, Giessen (NL); Allard Emile Bernadus Martinet, Giessen (NL)

(73) Assignee: Precision Makers B.V., Giessen (NL)

( * ) Notice: Subject to any disclaimer, the term of this patent is extended or adjusted under 35 U.S.C. 154(b) by 21 days.

(21) Appl. No.: 15/367,231

(22) Filed: Dec. 2, 2016

(65) Prior Publication Data

US 2018/0156622 A1 Jun. 7, 2018

(51) Int. Cl.
G01C 21/34 (2006.01)
G05D 1/02 (2006.01)

(52) U.S. Cl.
CPC ....... G01C 21/3407 (2013.01); G05D 1/0274 (2013.01)

(58) Field of Classification Search
CPC .......................... G01C 21/3407; G05D 1/0274
USPC ........................................................... 701/25
See application file for complete search history.

(56) References Cited

U.S. PATENT DOCUMENTS

| | | | |
|---|---|---|---|
| 6,128,574 A | 10/2000 | Diekhans | |
| 6,338,013 B1 * | 1/2002 | Ruffner | A01B 69/008 180/167 |
| 7,216,033 B2 * | 5/2007 | Flann | A01B 69/008 172/2 |
| 8,204,654 B2 * | 6/2012 | Sachs | A01B 79/005 700/1 |
| 8,209,075 B2 * | 6/2012 | Senneff | A01B 69/008 701/23 |
| 8,954,216 B2 * | 2/2015 | Yazaki | A01D 34/008 701/24 |
| 9,459,955 B2 * | 10/2016 | Tuers | G06F 11/1012 |

(Continued)

FOREIGN PATENT DOCUMENTS

| | | |
|---|---|---|
| DE | 102014202181 A1 | 8/2015 |
| WO | 2014/049399 A1 | 4/2014 |

OTHER PUBLICATIONS

R.W. Gunderson et al; "The Collective: GIS and the computer-controlled farm" Geospatial Solutions, vol. 10, No. 10, Oct. 1, 2000, p. 30, XP055244568, US, ISSN: 1529-7403.

*Primary Examiner* — Yazan A Soofi
(74) *Attorney, Agent, or Firm* — N.V. Nederlandsch Octrooibureau; Lindsey A. Auerbach; Catherine A. Shultz

(57) ABSTRACT

Method of autonomous path planning for a vehicle, comprising the steps of a) determining an outer boundary (2) and an inner boundary (4) of a working area (1a) for a vehicle to operate on, b) providing a direction parameter indicating a primary working direction (6) along which the working area (1a) is to be worked on; c) providing an angle parameter indicating an angle ($\alpha$) between a secondary working direction (8) and the primary working direction (6), wherein the secondary working direction (8) indicates a direction along which a plurality of working paths (10) are to be arranged within the inner boundary (4). The method further comprising the steps of d) calculating the plurality of working paths (10) within the inner boundary (4) based on the direction parameter and the angle parameter; and e) further calculating one or more connecting paths (16) between the outer boundary (2) and the inner boundary (4), each connecting path connecting two subsequent working paths (10).

14 Claims, 5 Drawing Sheets

(56) References Cited

U.S. PATENT DOCUMENTS

| | | |
|---|---|---|
| 2005/0034437 A1 | 2/2005 | McMurtry et al. |
| 2005/0075784 A1 | 4/2005 | Gray et al. |
| 2007/0233374 A1 | 10/2007 | Diekhans et al. |
| 2007/0255470 A1* | 11/2007 | Diekhans .............. A01B 69/008 |
| | | 701/50 |
| 2016/0091898 A1* | 3/2016 | Booher ................ G05D 1/0274 |
| | | 701/26 |
| 2017/0300064 A1* | 10/2017 | Wolters ................ G05D 1/0278 |

* cited by examiner

METHOD AND ROBOT SYSTEM FOR AUTONOMOUS CONTROL OF A VEHICLE

FIELD OF THE INVENTION

The present invention relates to a method for controlling a vehicle, in particular to a method of autonomous control of a vehicle. In a further aspect the present invention relates to a robot system for autonomous control of a vehicle.

BACKGROUND

US patent application US 2007/0255470 A1 discloses an agricultural machine system and method whereby a route is created for the machine system. The route includes working tracks along which the machine system is driven while the territory is being worked, and which further includes headland tracks along which the machine system is driven when it travels from one working track to the next working track. The machine system automatically processes a sequence of headland working steps at the end of one working track and/or while a subsequent headland track is being driven along and/or at the beginning of a subsequent working track. The sequence of headland working steps is updated and carried out dynamically depending on the current position of the machine system and depending on the next working track.

US patent publication U.S. Pat. No. 6,128,574 A discloses a route planning method for agricultural work vehicles having a definite working width for generation of at least one work path or track over a field. The method comprises steps of entering a field-specific datum and a work vehicle-specific datum into an electronic data processing unit and providing a computational algorithm in the electronic data processing unit for generation of the at least one work path or track, and including an optimization criterion for the at least one work path or track to be generated.

SUMMARY

The present invention seeks to provide a method for controlling a vehicle, wherein the method allows for completely autonomous and unmanned operation of the vehicle and ensures that reliable, accurate as well as reproducible vehicle motion planning is obtained. The method further allows for autonomous and unmanned control of one or more working functions to be performed by the vehicle in a reliable, accurate and reproducible fashion.

According to the present invention, a method as defined in the preamble above is provided comprising the steps of determining an outer boundary and an inner boundary of a working area for a vehicle to work on. The method further comprises providing a direction parameter indicating a primary working direction along which the working area is to be worked on by the vehicle, and providing an angle parameter indicating an angle between a secondary working direction and the primary working direction. The secondary working direction indicates a direction along which a plurality of working paths are to be arranged within the inner boundary.

A subsequent step of the method then involves the step of calculating the plurality of working paths within the inner boundary based on the direction parameter, the angle parameter, and further calculating one or more connecting paths between the outer boundary and the inner boundary wherein each connecting path connects two subsequent working paths.

The method allows for completely autonomous and unmanned operation of a vehicle based on a set of predetermined and/or selected parameters, such as the outer and inner boundary, the direction parameter, and the angle parameter. These parameters allow for efficient and accurate calculation of the plurality of working paths and further calculation of the one or more connecting paths between subsequent working paths. The calculations and operations may be fully automated without any further human intervention. The calculations yield an autonomously obtained vehicle path along which the vehicle traverses the working area, and wherein the vehicle perform various working functions such as mowing, ploughing, digging and the like along one or more sections of the plurality of working paths.

In a further aspect the present invention relates to a robot system for controlling a vehicle, wherein the robot system comprises a control unit fitted on a vehicle and a path planning module, wherein the path planning module interfaces with the control unit locally or remotely; one or more vehicle actuators and one or more vehicle sensors. The path planning module and control unit are configured for autonomous engagement with the one or more vehicle actuators and the one or more vehicle sensors of the vehicle through execution of the above method.

The robot system of the present invention allows aftermarket customization of an existing vehicle such that autonomous and unmanned operation of the vehicle is possible. The robot system further eliminates the need for investing in a new vehicle. The robot system need not alter human operability of the vehicle and a such the vehicle remains manually operable should the need arise.

SHORT DESCRIPTION OF DRAWINGS

The present invention will be discussed in more detail below, with reference to the attached drawings, in which FIG. 1a shows an embodiment of a working area defined by an outer boundary and an inner boundary according to the present invention;

DESCRIPTION OF EMBODIMENTS

Figure 1A:
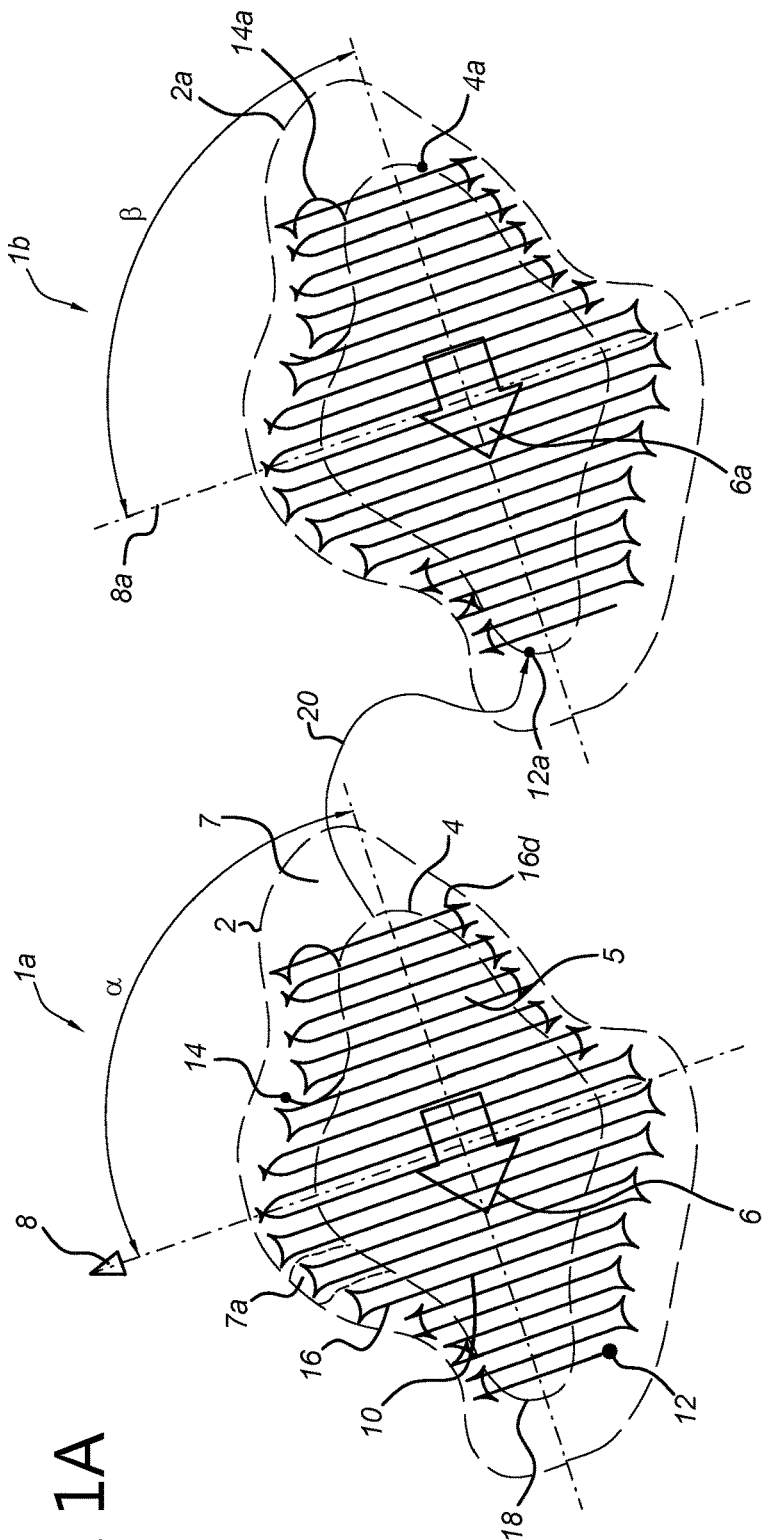
FIG. 1b shows an alternative embodiment of a working area defined by an outer boundary and an inner boundary according to the present invention.
Figure 1B:
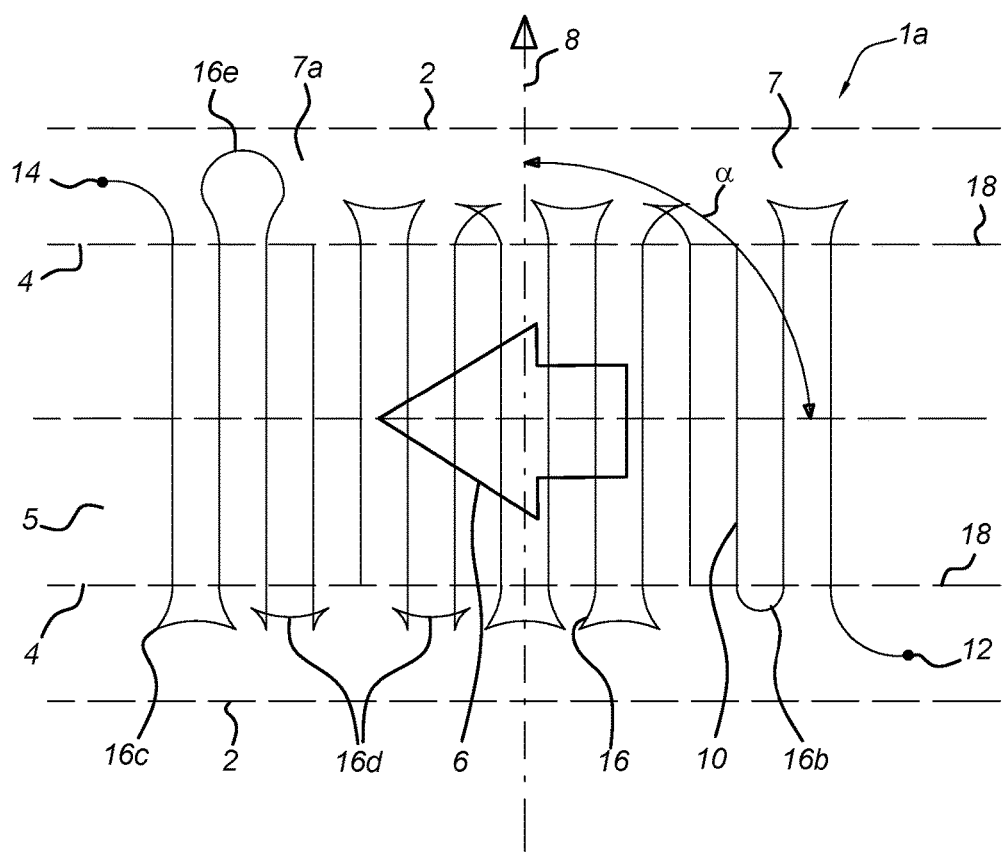

FIGS. 1a and 1b each show an embodiment of a working area 1a defined by an outer boundary 2 and an inner boundary 4 according the present invention. In the embodiments shown, the working area 1a is defined by the outer boundary 2 within which a vehicle is to operate autonomously. In particular, in FIG. 1a it is shown that the outer boundary 2 may define a closed boundary or closed contour encircling a working area 1a for the vehicle to work on and within which the vehicle is required to remain during operation. Alternatively, in FIG. 1b it is shown that the outer boundary 2 may also define an elongated working area 1a within which the vehicle is required to remain during operation. For example, in the embodiment of FIG. 1b the outer boundary 2 comprises substantially parallel (straight or curved) lines/boundaries 2 between which the vehicle is to remain during operation. Such outer boundaries 2 are often seen in agricultural applications wherein the working area 1*a* is substantial rectangular.

The working area 1*a* is further defined by an inner boundary 4 within which the vehicle is scheduled to operate and in particular to perform one or more working functions such as mowing, ploughing, digging and the like. Like the outer boundary 2, in an embodiment the inner boundary 4 may define a closed boundary or closed contour encircling an area for the vehicle to work on. In the embodiment of FIG. 1*a*, the inner boundary 4 is a closed boundary encircled by the closed outer boundary 2. In FIG. 1*b* on the other hand the inner boundaries 4 define an elongated area within which the vehicle is scheduled to perform one or more working functions. In this embodiment the outer and inner boundary 2, 4 define an elongated area comparable to, for example, an elongated rectangular headland area or so-called "turnrow" in agricultural applications.

For both embodiments of FIGS. 1*a* and 1 *b*, the inner boundary 4 defines a primary working area 5 on which the vehicle performs or executes one or more working functions. The area between the outer boundary 2 and the inner boundary 4 forms a secondary working area 7 in which the vehicle is allowed to perform various driving and turning manoeuvres but also one or more working functions if required. As a result, the secondary working area 7 may allow greater operational freedom of the vehicle than the operational freedom of the vehicle within the primary working area 5.

The method of the present invention provides autonomous or so-called "unmanned" control of a vehicle within the working area 1*a*, wherein the vehicle operates autonomously and, in particular, autonomously performs one or more working functions in the primary working area 5 and the secondary working area 7 if required.

According to the present invention, the method comprises a step (a) of determining the outer boundary 2 and the inner boundary 4 of the working area 1*a* for the vehicle to operate on. In this step, the outer boundary 2 and/or the inner boundary 4 may for example be determined on the basis of general map data and/or or on the basis of dedicated measurement data for the working area 1*a*. Alternatively, the outer boundary 2 and/or the inner boundary 4 may also be determined through real-time positional information about the outer boundary 2 and/or inner boundary 4, such as real-time GPS, real-time local beacon data and/or real-time vision based data providing positional data about the outer boundary 2 and/or inner boundary 4.

The method further comprises the step (b) of providing a direction parameter indicating a primary working direction 6 along which the vehicle is to traverse the working area 1*a*, and in particular the primary working area 5. The direction parameter as indicated by the arrow 6 may be provided by a human operator on the basis on particular requirements in which direction the vehicle should traverse the working area 1*a*. This may be accomplished by e.g. locally providing the direction parameter such as operating a control interface/console on the vehicle and/or by operating a control interface/console remote from the vehicle. For example, a vehicle configured for autonomous operation on a working area 1*a* such as a soccer field or golf course may be required to traverse the working area 1*a* in the primary working direction 6 according to a play direction on the soccer field or golf course. Such a play direction may be of importance as this may impose particular requirements on a surface texture of the working area 1*a* and in particular the primary working area 5. Providing the direction parameter may therefore take into account a required surface texture left by the vehicle once the working area 1*a* has been worked on.

In an embodiment, the direction parameter comprises an azimuth parameter, which may be based on an azimuth system ranging from 0° to 360° degrees as measured clockwise from the Magnetic North, True North or Grid North. For example, North may have a direction of 0 or 360° degrees. South may have an azimuth of 180°. East may have an azimuth of 90° and West may have an azimuth of 270°. In an alternative embodiment, the direction parameter may comprise a bearing parameter, which may be based on a bearing system comprising four quadrants of 90° degrees. In this system North and South may each have a direction of 0° degrees, and wherein East and West both have a direction of 90°. For example, the direction North East may be designated as N45°E and South West may be designated as S45°W.

In a further embodiment the direction parameter indicating the primary working direction 6 may comprise a parameter indicating a direction in which the vehicle (e.g. its "nose") is (initially) pointed to. In an even further embodiment, the direction parameter indicating the primary working direction 6 may comprise a parameter indicating a play direction on a soccer field or golf course. For example, a (straight) line may be envisaged between two opposite goal areas on a soccer field, wherein the line provides a direction parameter indicating the primary working direction 6. On a golf course a (straight) line may be envisaged between the teeing ground and the putting green, so that the line is a direction parameter indicating the primary working direction 6.

In addition to providing a direction parameter, the method further comprises the step of (c) providing an angle parameter indicating an angle ($\alpha$, $\beta$) between the primary working direction 6 and a secondary working direction 8, wherein the secondary working direction 8 indicates a direction along which a plurality of working paths 10 are to be arranged within the inner boundary 4, i.e. in/on the primary working area 5. The plurality of working paths 10 indicate specific paths along which the vehicle is to perform one or more working functions within the inner boundary 4.

In an embodiment, the method step of c) providing an angle parameter comprises providing an angle ($\alpha$, $\beta$) between 0 and 360° degrees. This embodiment allows any angle ($\alpha$, $\beta$) to be provided for maximum accuracy and precise orientation of the primary and secondary working direction 6, 8.

In an alternative embodiment, the method step of b) providing an angle parameter may also comprise providing 12, 18, 36, or any other number of distinct angles ($\alpha$, $\beta$) between 0 and 360° degrees. This embodiment provides a set of distinct set of angles ($\alpha$, $\beta$) to choose from for indicating the orientation between the primary and secondary working direction 6, 8. Providing a fixed number of angles ($\alpha$, $\beta$) to choose from may reduce hardware requirements. In this embodiment the angle parameters, i.e. the set of distinct angles ($\alpha$, $\beta$), may be evenly or non-evenly distributed between 0 and 360° degrees.

Naturally, having a greater number of angles ($\alpha$, $\beta$) to choose from between 0 and 360° allows for greater accuracy and detailed control over orientations of the plurality of working paths 10 with respect to the primary working direction 6. As a result, the embodiment wherein the angle parameter indicates any angle ($\alpha$, $\beta$) between 0 and 360° provides for maximum accuracy and precise control over the orientation of the secondary working direction 8 with respect to the primary working direction 8, thereby allowing for improved compliance with requirements on desired orientations between the primary and secondary working direction 6, 8.

In an embodiment the plurality of working paths 10 form a parallel arrangement of curved working paths 10. In a further embodiment the plurality of working paths 10 comprise a parallel arrangement of straight working paths 10. Having a parallel arrangement of curved and straight working paths 10 is possible in an even further embodiment. Generally, the one or more working paths 10 indicate paths followed by the vehicle along which the working area 1a is traversed in the primary working direction 6. Furthermore, along the plurality of working paths 10 the vehicle autonomously performs one or more working functions such a mowing, ploughing, digging or any other working function deemed necessary along the one or more working paths 10.

In an embodiment, the method may comprise the step of selecting a start point 12 and an end point 14 for the vehicle, wherein the start point 12 and end point 14 provide two points between which the vehicle is to move autonomously across the working area 1a. From a path planning perspective, the start point 12 and end point 14 may be arbitrary points which may lie inside or even outside the working area 1a. In the exemplary embodiments of FIGS. 1a and 1b the start point 12 and end point 14 lie in the secondary working area 7 for illustrative purposes. Note that the start point 12 and end point 14 may be actively provided by a human operator but it may also be determined from a current location of the vehicle and/or autonomously dealt with by a system executing the method.

To enable for autonomous control of the vehicle, the method then comprises the step of (d) calculating/computing the plurality of working paths 10 within the inner boundary 4 based on the direction parameter and the angle parameter, and (e) further calculating/computing one or more connecting paths 16 between the outer boundary 2 and the inner boundary 4, wherein each connecting path 16 connects two subsequent working paths 10.

The one or more connecting paths 16 may be associated with paths followed by the vehicle for manoeuvring said vehicle from one working path 10 to a subsequent working path 10. The one or more connecting paths 16 thus connect the plurality of working paths 10 so that a continuous path is calculated/computed for autonomous control of the vehicle.

According to the method of the present invention, the method provides autonomous control of the vehicle by calculating/computing the plurality of working paths 10 and the one or more connecting paths 16 in advance based on a predetermined set of parameters comprising the outer boundary 2, the inner boundary 4, the direction parameter, and the angle parameter. This set of predetermined parameters provides sufficient input for computing in advance the plurality of working paths 10 and the one or more connecting paths 16 to be traversed by the vehicle across the working area 1a.

Note that in an embodiment the method steps of d) calculating the plurality of working paths 10 and e) further calculating one or more connecting paths 16 may be performed by the autonomous vehicle itself and/or by an external planning system. Performing the calculations on the vehicle itself provides for a compact, standalone solution for autonomous control of the vehicle but may require higher vehicle costs in view of hardware requirements. Conversely, performing the calculations by an external planning system may allow for a cost effective vehicle but would require costs for having an external planning system and an associated infrastructure.

The set of predetermined parameters may be provided by a human operator on a case to case basis, such as for non-repetitive vehicle operation on the working area 1a. Also, an existing library comprising a plurality of sets of predetermined parameters may be provided based on previous vehicle operation on a particular working area 1a.

An advantage of the method of the present invention is that the plurality of working paths 10 and the one or more connecting paths 16 are calculated or computed in advance based on the abovementioned parameters. For example, an alternative technique that may be used to obtain an overall planned path along which a vehicle is to traverse a working area 1a is through "teach and play". This technique may comprise manual operation of the vehicle by a human operator for driving the vehicle along a desired path which is then recorded and executed at a later time. A disadvantage of such "teach and play" methodology is reduced accuracy when obtaining the plurality of working paths 10 and one or more connecting paths 16. Furthermore, orientations and shapes of the plurality of working paths 10 and the one or more connecting paths 16 may be non-optimal with respect to the working area 1a. Moreover, overlap between the plurality of working paths 10 and/or overlap between the one or more connecting paths 16 may not be optimized, e.g. minimized. While recording the path driven by a vehicle, a human operator may also introduce errors when driving and some parts of the working area 1a may be driven repeatedly, causing visible damage in the form of e.g. tyre tracks on the working area 1a.

The method of the present invention on the other hand is able to autonomously and dynamically calculate the one or more working paths 10 as well as the one or more connecting paths 16, so that a most efficient and fastest path for the vehicle is obtained with minimal overlap between the plurality of working paths 10 and with minimal overlap of the one or more connecting paths 16. The method further allows for a limited set of parameters to be used such that a plurality of working paths 10 and one or more connecting paths 16 can be calculated/computed and optimized given a particular shape of the working area 1a, and in particular the shape of the primary working area 5 and the secondary working area 7.

A further advantage of the present invention is that the method allows for high reproducibility of planning the plurality of working paths 10 and the one or more connecting paths 16 for a given outer boundary 2 and an inner boundary 4 as the calculations are systematic and reproducible by themselves.

For example, there may be cases wherein a working area 1a is not allowed to "shift" in location between seasons, wherein the working area 1a is only worked on by the vehicle during e.g. the summer season. Then due to e.g. growth of vegetation between such seasons it may be the case that accurate determination of the working area 1a may not be possible based on visual inspection alone. Should such visual inspection be used to plan the plurality of working paths 10 and the one or more connecting paths 16, then this will generally lead to a new shape of working paths 10 and/or connecting paths 16.

To circumvent the above problem, the method of the present invention allows the plurality of working paths 10 and one or more connecting paths 16 to be calculated accurately in a reproducible manner based on given outer and inner boundaries 2, 4, a direction parameter, and an angle parameter, and optionally also the start point 12 and the end point 14 when provided. This in turn ensures that a constant and reproducible shape of the working area 1a can be maintained as well as planned working paths 10 and connecting paths 16.

In an embodiment, for example, the method steps of d) calculating the plurality of working paths 10 and/or e) further calculating one or more connecting paths 16 may be based on global positioning information with or without differential corrections or local positioning information supplied by one or more local beacons on the working area 1a and/or vision based systems.

Because of absolute positioning through GPS and/or localised beacons, the working area 1a may be determined accurately and the plurality of working paths 10 and the one or more connecting paths 16 can be calculated optimally and accurately without requiring visual inspection.

In a further embodiment, the method step of d) calculating the plurality of working paths 10 and/or e) further calculating the one or more connecting paths 16 may comprises calculating and/or selecting optimal curvature algorithms, e.g. Bezier, clothoid based curvature algorithms. This embodiment allows for calculating and/or selecting optimal curvatures (e.g. Bezier, clothoid) for meeting the predetermined set of parameters in an optimal manner. Also, this embodiment may further improve transitions between the plurality of working paths 10 and the one or more connecting paths 16. In an even further embodiment the method step of d) calculating the plurality of working paths 10 and/or e) further calculating the one or more connecting paths 16 may comprise calculating and/or selecting one or more optimal continuous curvatures, e.g. continuous curvature algorithms. This embodiment may further improve smoothness of the plurality of working paths 10 and/or the one or more connecting paths 16.

In an embodiment, the method may further comprise the step of calculating a trimming path 18 along at least a part of the inner boundary 4. This embodiment is advantageous when parts of the inner boundary 4 exhibit an unwanted surface texture caused by entering and exiting the secondary working area 7 by the vehicle when moving between subsequent working paths 10. For example, when the vehicle mows a golf course the trimming path 18 may be viewed as a "clean up" lap that allows for removal of e.g. jagged or rough edges along at least a part of the inner boundary 4.

In a further embodiment, the method step of calculating the trimming path 18 may further comprise calculating the trimming path 18 along a closed inner boundary 4 in clockwise or counter clockwise fashion. In this embodiment the inner boundary 4 can be trimmed completely in a clockwise or counter clockwise fashion to ensure the primary working area 5 is completed without having an unwanted surface texture in the form of e.g. jagged, skewed, rough edges and the like at or near the inner boundary 4.

In an even further embodiment, the method step of calculating a trimming path 18 along a part or the entire inner boundary 4 may further comprise calculating the trimming path 18 at an offset trimming distance from the inner boundary 4. In this embodiment the trimming path 18 is not located at the inner boundary 4 but is calculated substantially parallel to (e.g. outside or inside) the inner boundary 4 at the offset trimming distance. The offset trimming distance may be provided as a further predetermined parameter to the method.

The method steps of calculating a trimming path 18 as outlined above may be executed as a last part of the plurality of working paths 10 or the one or more connecting paths 16.

Figure 2:
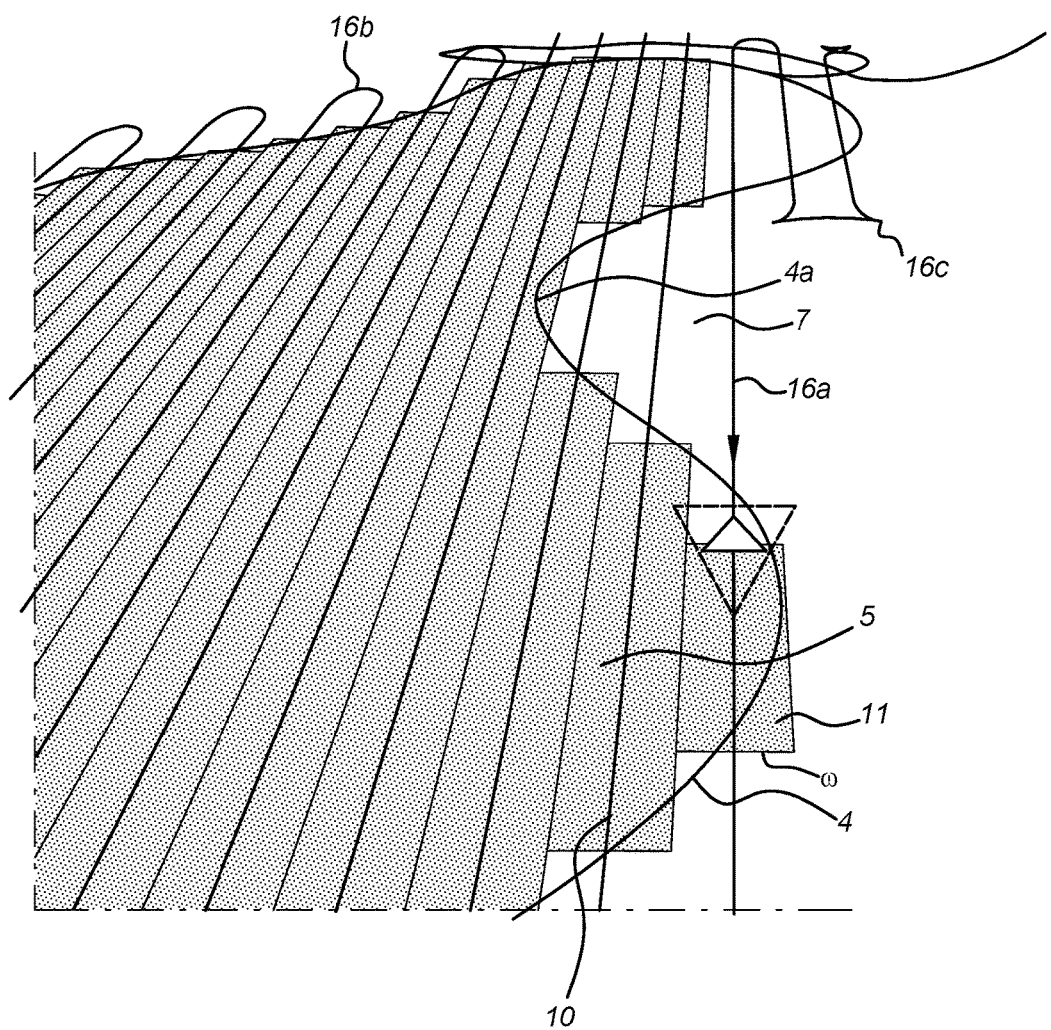
FIG. 2 shows an embodiment of one or more connecting paths between subsequent working paths according to the present invention.

An important advantage of the method of the present invention is that the plurality of working paths 10 and the one or more connecting paths 16 are calculated to provide an optimal arrangement thereof, wherein, for example, overlap between the one or more working paths 10 and/or the one or more connecting paths 16 is minimized. Calculating an optimal arrangement of paths is particularly advantageous for the secondary working area 7, which may in some cases provide little room for the vehicle to move on, so that optimization of the one or more connecting paths 16 becomes necessary. The method of the present invention enables computation of the one or more connecting paths 16 in a manner that allows the vehicle to efficiently traverse the secondary working area 7 such that subsequent working paths 10 accurately connected. FIG. 2 shows an embodiment of one or more connecting paths between subsequent working paths according to the present invention. In the depicted embodiment, an exemplary inner boundary 4 is depicted as well as a plurality of working paths 10, e.g. a parallel arrangement of straight working paths 10, and one or more connecting paths 16a, 16b, 16c. Furthermore, in the depicted embodiment the inner boundary 4 comprises a pronounced concave portion 4a.

For optimally calculating the one more working paths 10 and one or more connecting paths 16, the method step of (e) may comprise the step of determining an available connecting space 7a between the outer boundary 2 and inner boundary 4 for each connecting path 16 and, based on the available connecting space 7a, calculating a straight connecting path 16a, a U-turn connecting path 16b, or a two-point turn connecting path 16c comprising reverse motion. As an alternative to the U-turn connecting path 16b, calculating an Omega-turn ("Ω") connecting path 16e is also possible, see FIG. 1b.

The above embodiments take into account that the space between the outer boundary 2 and the inner boundary 4, referred to as the available connecting space 7a, may not be uniform within the working area 1a. As a result, the autonomous vehicle may not be able to move from one working path 10 to a subsequent working path 10 in identical fashion. Then given an available connecting space 7a, which can be determined from the outer boundary 2 and the inner boundary 4, it is possible to calculate an optimal manoeuvre, such as a turning manoeuvre, for moving between working paths 10.

According to the above mentioned embodiments, for an available connecting space 7a a U-turn or Omega-turn connecting path 16b, 16e can be calculated. The U-turn or Omega-turn connecting path 16b, 16e comprises only forward motion of the vehicle when going from one working path 10 to another. Alternatively, a two-point turn connecting path 16c can be calculated, which comprises reverse motion of the vehicle. In particular, the two-point turn connecting path 16c comprises forward motion when exiting the primary working area 5, then comprises reverse motion within the secondary working area 7, and then comprises forward motion when entering the primary working area 5 for starting a subsequent working path 10. Such two-point turn connecting path 16c allows for a reduced available connecting space 7a when not enough space is available for a U-turn or Omega-turn connecting path 16b, 16e.

Further, the above embodiment also allows for calculation of a straight connecting path 16a as depicted in FIG. 2 should the inner boundary 4 comprise a pronounced concave section 4a along which a part of a working path 10 would be calculated. When calculating a straight connecting path 16a, in a further embodiment it may be calculated that the vehicle need not perform one or more working functions (grass mowing, digging, ploughing etc.) when traversing the secondary working area 7. In this embodiment the vehicle may be instructed to retract and/or disable any working tool such as a mowing tool, digging tool and/or a ploughing tool utilized along the one or more working paths 10 while traversing the secondary working area 7. Therefore, in an embodiment the method may also comprise the step of stopping, e.g. temporarily stopping, one or more working functions in the secondary working area 7. In a particular embodiment the method may comprise the step of stopping, e.g. temporarily stopping, one or more working functions while traversing a straight connecting path 16a. Stopping the one or more working functions may be achieved by disabling, retracting and/or lifting one or more working tools. Further examples of the one or more working tools may be a grass mowing tool, (street) brush tool, a snow mover tool, a sand blast tool, a water blast tool, a suction head tool and so forth, wherein each of such tools may be mountable to the vehicle as a dedicated or replaceable vehicle accessory.

It should be noted that calculating the above-mentioned connecting turn paths within the secondary working area 7, and in particular the connecting space 7a, may further take into account a size (e.g. length, width) of the vehicle for calculating a most optimal connecting path 16a, 16b, 16c, 16d, 16e.

Referring back to FIG. 1, in an advantageous embodiment the method may further comprise calculating a four-point turn connecting path 16d comprising reverse vehicle motion. This embodiment may be advantageous when the available connecting space 7a is not sufficient to calculate a U-turn or Omega-turn connecting path 16b, 16e nor to calculate a two-point turn connecting path 16c. The four-point turn connecting path 16d may be described as a connecting path 16 that comprises forward motion when exiting the primary working area 5 followed by reverse motion within the secondary working area 7, followed by forward motion within the secondary working area 7, then followed again by reverse motion within the secondary working area 7, and finally followed by forward motion for entering the primary working area 5.

In view of the above it may be inferred that the number of forward and reverse motion changes necessary when calculating the one or more connecting paths 16 at least in part determines damage done to and near the inner boundary 4. As a result, calculating a trimming path 18 as described above may mitigate such damage at or near the inner boundary 4 as a result of complicated connecting paths 16 needed within the secondary working area 7.

For example, a golf course usually comprises a grass surface that is often subjected to high surface texture standards and requirements. However, a vehicle moving along complex connecting paths 16 may promote damaging the golf course at or near the inner boundary 4. Calculating a trimming path 18 along the inner boundary 4 may therefore mitigate such damage so that the required surface texture for the golf course is respected.

In order to optimize calculation of a particular connecting path 16 in an available connecting space 7a, the method of the present invention provides an embodiment wherein a penalty system is utilised for ranking various calculated connecting paths 16 and selecting a connecting path 16 having an optimal score (e.g. lowest or highest score) depending on the particular penalty system used. Such a penalty system allows for selecting a calculated connecting path 16 that satisfies requirements for a given connecting space 7a in some optimal manner.

For example, in an embodiment the method step of e) further calculating one or more connecting paths 16 comprises determining, for a connecting path of the one or more connecting paths 16, one or more candidate connecting paths each having an associated penalty score, and selecting a candidate connecting path having a lowest penalty score; and applying the selected candidate connecting path as the calculated connecting path of the one or more connecting paths 16. The penalty system as defined in this embodiment allows for a systematic approach for calculating an optimal connecting path 16 for a given available connecting space 7a. An optimal connecting path 16 may comprise further optimization as to a shape of the connecting path 16 through calculating of e.g. a clothoid or Bezier based connecting path.

In an exemplary embodiment, the method further comprises defining the lowest penalty score based on inner boundary crossing and outer boundary crossing by the vehicle, wherein inner boundary crossing has a higher penalty score or lower penalty score than a penalty score of outer boundary crossing. For example, in this embodiment a higher penalty score may be associated with crossing the inner boundary 4 compared to a lower penalty score associated with crossing the outer boundary 2 or, conversely, a lower penalty score may be associated with crossing the inner boundary 4 compared to a higher penalty score associated with crossing the outer boundary 2. This embodiment may therefore favour outer boundary crossing over inner boundary crossing or vice versa based on associated penalty scores.

The penalty system may be of use for e.g. a soccer field or golf course, where the inner boundary 4 and the primary working area 5 are required to have a particular surface texture free from damage or irregularities as a result of vehicle manoeuvres within the secondary working area 7. The above exemplary penalty system may result in calculating a connecting path 16 that does not allow inner boundary crossing to ensure that a required surface texture of the primary working area 5 is maintained.

Of course, various other penalty scores/systems can be devised that would yield an optimal connecting path 16 for a given connecting space 7a. For example, in an embodiment it is conceivable that a penalty score can be associated with respect to a least amount of time and/or distance required for traversing the working area 1a. In a further embodiment it is conceivable that a penalty score can be associated with having minimal overlap between two adjacent working paths 10 and to calculate a connecting path 16 within the available connecting space 7a that minimizes the overlap between two adjacent working paths 10.

For example, it is possible to consider a working zone 11 having a working width "w", see FIG. 2, associated with a working path 10. Such a working width "w" may be associated with the vehicle. A penalty system may be devised utilizing a penalty score associated with having minimal overlap between two adjacent working paths 10, i.e. working zones 11, and to calculate a connecting path 16 within the available connecting space 7a that minimizes the overlap between the two adjacent workings zones 11 of the associated working paths 10.

Without loss of generality, it should be noted that the plurality of working paths 10 and the one or more connecting paths 16 of the present invention may each be assigned to have the working "w", which is often determined by a working width of the vehicle and often determined at least in part by a working tool attached to the vehicle.

In an embodiment the method may further comprise providing an overlap parameter indicating a size of overlap between two adjacent working paths 10, e.g. a size of overlap between adjacent working zones 11. The overlap parameter may be regarded as a safety margin to ensure that the primary working area 5 is indeed completely worked on. Such an overlap parameter allows for a predetermined fixed overlap region between two workings zones 11. The overlap parameter may in an embodiment be provided as a predetermined parameter, where calculation of the plurality of working paths 10 and the one or more connecting paths 16 take into account the overlap specified. In an even further embodiment the overlap parameter may be dynamically provided and may also vary when the vehicle traverses the working area 1a.

The method of the present invention allows for autonomous control based on calculating or computing the plurality of working paths 10 and the one or more connecting paths 16, thereby providing accurate, reliable and reproducible path planning for a vehicle. However, in particular situations it may be desirable that the reproducibility of path planning and calculation by the method can be offset to prevent e.g. creation of unwanted marks on the primary working area 5 by the vehicle. This issue may be applicable to soccer fields or golf courses, for example, where regularly mowing the soccer field or golf course would potentially create visible tracks at the same location throughout the working area 1a as the method may calculate substantially identical working paths 10 and/or connecting paths 16.

In view of the above issue, in an embodiment the method steps of d) calculating the plurality of working paths 10 or e) further calculating one or more connecting paths 16 comprises calculating a working offset distance from a working path of the plurality of working paths 10 or calculating a connection offset distance from a connecting path of the one or more connecting paths 16, respectively. This embodiment reduces the effects of e.g. visible marks left or damage done by the vehicle to the working area 1a as it traverses said working area 1a. These problems become more pronounced when the vehicle traverses the workings area 1a repeatedly along identical or near identical calculated working paths 10 and/or connection paths 16. By anticipating situations where the vehicle may likely traverse the working area 1a multiple times along identical working paths 10 and/or connecting paths 16, calculating a working offset distance and/or connecting offset distance with respect to the calculated workings paths 10 and/or connecting paths 16 reduces such visible marks and damage.

In addition, since the method may also comprise the step of calculating a trimming path 18 along at least a part of the inner boundary 4 as mentioned earlier, an embodiment may be provided wherein a trimming path 18 is calculated at an offset trimming distance from the inner boundary 4 to avoid visible marks on the working area 1a or damage done by the vehicle near the inner boundary 4.

As described earlier, the method of the present invention calculates in advance the plurality of workings paths 10 and the one or more connecting paths 16 based on a set of parameters (i.e. inner and outer boundary 4,2, the direction parameter, and angle parameter ($\alpha,\beta$)). However, the method of the present invention may allow for dynamic updatability of calculated working paths 10 and/or connecting paths 16. In an embodiment the method further comprises dynamically detecting an obstacle on the calculated plurality of working paths 10 and/or the one or more connecting paths 16, and recalculating the plurality of workings paths 10 and/or the one or more connecting paths 16. This embodiment may take into account scenarios when one or more obstacles appear unexpectedly along the calculated workings paths 10 and/or the connecting paths 16. In an embodiment, dynamically detecting an obstacle may be achieved by using e.g. laser scanners, regular vision and/or infrared cameras, radar and sonar scanners and the like. The method therefore allows for optimal autonomous control by looking ahead during traversal of the workings area 1a and update the calculated working paths 10 and connecting paths 16 when required.

It is of course possible that one or more obstacles are already present and known to exist within the working area 1a. In this case dynamic recalculation of the plurality of workings paths 10 and/or one or more connecting paths 16 is not necessary. The method may then calculate the plurality of working paths 10 and/or further calculate the one or more connecting paths 16 in advance by taking into account such pre-existing obstacles. This may be accomplished by e.g. providing an obstacle zone enclosing the obstacle to be avoided by the vehicle.

In an exemplary embodiment, one or more obstacles may be located or identified through one or more absolute or relative coordinates. For example, a golf course may comprise one or more trees and/or one or more sand bunkers that may be seen as obstacles that are known in advance as pre-existing obstacles. As outlined above, the method may take into account such known obstacles and immediately calculate, in advance, a plurality of working paths 10 and/or one or more connecting paths 16 that avoid the known obstacles.

Therefore, the method steps of d) calculating the plurality of working paths (10) and/or e) further calculating the one or more connecting paths (16) may further comprise avoiding one or more predefined obstacles and/or one or more dynamically detected obstacles.

The method of the present invention provides for complete and autonomous control of a vehicle through determining a set of predetermined parameters and to calculate a plurality of working paths 10 and one or more connecting paths 16 within a working area 1a based on these parameters. Even though a single working area 1a has been discussed so far, the method of the present invention allows for a plurality of working areas to be successively traversed by a vehicle in autonomous fashion. To that end an advantageous embodiment is provided wherein the method may further comprise calculating an intermediate path 20 connecting the working area 1a and a further working area 1b for the vehicle to work on autonomously. This embodiment allows the vehicle to autonomously work on a plurality of working areas 1a, 1b without any human intervention. The intermediate path 20 may allow the vehicle to perform one or more working functions. For example, in an embodiment the intermediate path 20 may be regarded as a working path on which the vehicle performs a working function. In this way the vehicle moves between the plurality of working areas 1a, 1b while performing a particular task, such as mowing, ploughing, digging etc. In an alternative embodiment the intermediate path 20 may be seen as a connecting path on which the vehicle does not primarily perform a working function but disables one or more working tools fitted to the vehicle.

In the embodiment of FIG. 1, the method may take into account that a plurality of working areas 1a, 1b are designated on which a vehicle should work autonomously. In such a case the method further calculates an intermediate path 20 connecting the workings area 1a and a further working area 1b, wherein the intermediate path 20 extends there between.

As an example, the intermediate path 20 may start from some end point 14 associated with the working area 1a to a further start point 12a associated with the further working area 1b. However, as mentioned earlier, actual locations of various start points 12, 12a and end points 14, 14a are arbitrary and may be chosen according to requirements. The method may then continue with the same steps as disclosed above, wherein a further outer boundary 2a and inner boundary 4b are determined, and wherein a further direction parameter and a further angle parameter ($\beta$) are provided. Note that a further primary working direction 6a and a further secondary working direction 8a associated with the further working area 1b need not be the same as the primary working direction 6 and the secondary working direction 8 of the working area 1a. Considerable flexibility is therefore provided by the method as a plurality of individual working areas 1a, 1b can be worked on complete autonomously and for each working area 1a, 1b a plurality of working paths 10 and one or more connecting paths 16 can be calculated in an optimal manner, as well as intermediate paths 20 for traversing from one working area to another working area.

To further explain the advantage of the intermediate path 20, three working areas may be considered that are to be connected by e.g. two or three intermediate paths 20. In particular, for such three working areas a first intermediate path 20 between a first and a second working area may be calculated, and a second intermediate path 20 between the second and the third working area may be calculated. Alternatively, a first intermediate path 20 may be calculated between the first and the second working area, a second intermediate path 20 between the second and the third working area, and a third intermediate path 20 between the first and the third working area 20. The method of the present invention therefore allows one or more intermediate paths 20 to be calculated between a plurality of working areas 1a, 1b in any way necessary and wherein the calculation provides a most optimal arrangement of intermediate paths 20 for moving between working areas.

In view of the above method and embodiments described above, in a further aspect the present invention relates to a robot system for controlling a vehicle autonomously, wherein reference is made to FIG. 1a, 1b and FIG. 2 as used to explain the method.

Figure 3A:
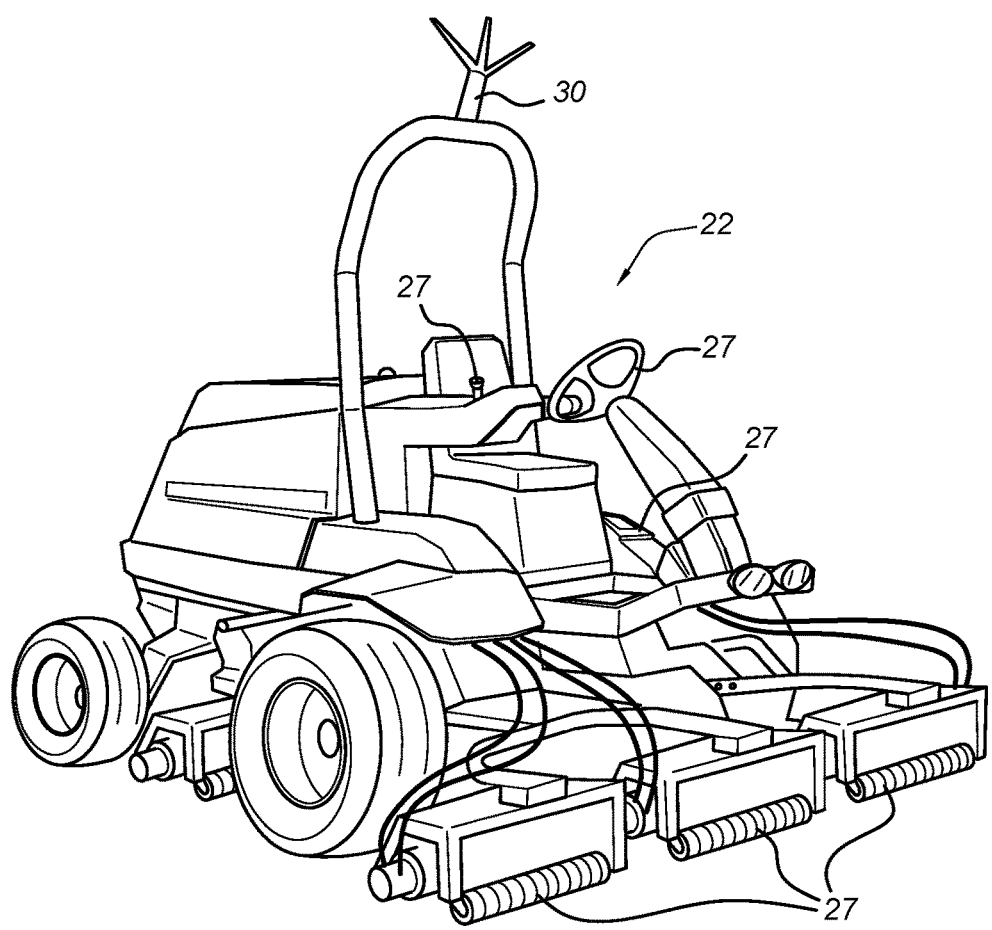
FIG. 3a shows an embodiment of an autonomous vehicle according to the present invention.
Figure 3B:
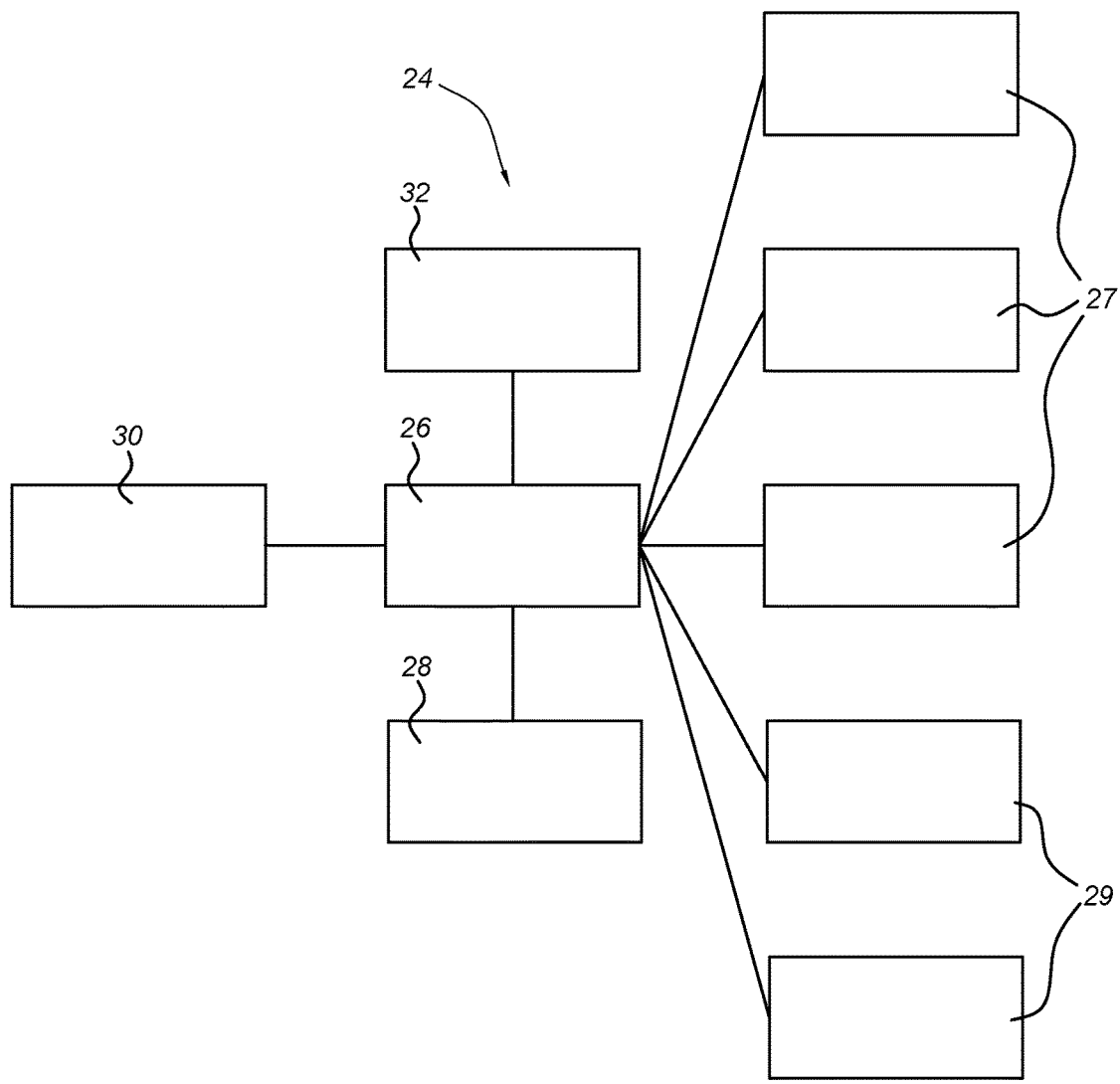
FIG. 3b shows an embodiment of a robot system according to the present invention.

FIG. 3a shows an embodiment of an autonomous vehicle 22 and FIG. 3b shows an embodiment of a robot system 24 according to the present invention. The robot system 24 as shown in FIG. 3b may fitted on the vehicle 22, wherein the vehicle 22 may be regarded as an existing vehicle adapted for manned operation. In the depicted embodiment the path planning module 26 is mounted on the vehicle 22 but it may in further embodiments also be arranged remote from the vehicle 22. For example, in an embodiment the path planning module 26 may be a centrally located path planning module 26 remote from the vehicle 22 for executing the method of the present invention. In a further embodiment the centrally located path planning module 26 may be a cloud or internet based path planning module 26 for efficiently calculating working paths 10 and connecting paths 16 for one or more vehicles 22. In this embodiment hardware requirements for the vehicle are less critical and may be less complex and be more cost effective.

The vehicle 22 may be regarded as a fully functional vehicle suitable for manned operation but which is retrofitted with the robot system 24 through "aftermarket" customizations. The path planning module 26 interfaces with a control unit 28, one or more vehicle actuators 27 and one or more vehicle sensors 29. The path planning module 26 and control unit 28 are configured for autonomous engagement with the one or more vehicle actuators 27 and the one or more vehicle sensors 29 of the vehicle 22 through execution of the method steps according to the present invention and above disclosed embodiments. The one or more vehicle actuators 27 may comprise, for example, steering actuators, braking actuators, accelerator actuators as well as one or more working tools such as mowing, ploughing or digging tools. The one or more vehicle sensors 29 may comprise, for example, steering sensors, braking sensors, accelerator sensors as well as working tool sensors such as mowing, ploughing or digging sensors and the like.

As mentioned above with respect to the method of the present invention, the vehicle 22 may comprise one or more working tools as dedicated or replaceable vehicle accessories, wherein the one or more working tools interface with the control unit 28 and path planning module 26 and are controlled thereby. For example, in an embodiment the path planning module 26 and the control unit 28 may be arranged for enabling and/or disabling a working tool mounted to the vehicle 22. This may be advantageous when the vehicle 22 traverses the secondary working area 7, wherein the path planning module 26 and control unit 28 are arranged for (temporarily) disabling a working tool mounted on the vehicle 22 when traversing the secondary working area 7. This embodiment allows the vehicle 22 to move (e.g. turning) in the secondary working area 7 without performing a particular working function.

In an embodiment, see FIG. 2, the path planning module 26 and control unit 28 may be arranged for disabling, e.g. temporarily disabling, a working tool mounted on the vehicle 22 while traversing a straight connecting path 16a in the secondary working area 7. In this embodiment the working tool mounted to the vehicle 22 may be temporarily disabled by the path planning module 26 and control unit 28 through e.g. retraction or lifting the working tool, such as a grass mowing tool, when the vehicle 22 moves along the straight connecting path 16a.

As explained in light of the method above, further exemplary embodiments of the one or more working tools may be a mowing tool, digging tool, ploughing tool, street brush tool, snow mover tool, sand blast tool, water blast tool, and/or a suction head tool etc. Each of such tools may be mountable to the vehicle as a dedicated or replaceable vehicle accessory.

In an embodiment, the robot system 24 may further comprise a wireless communication system 30 fitted on the vehicle and connected to the path planning module 26, wherein the wireless communication system 30 is configured for determining positional information, e.g. real-time positional information, of the vehicle 22 and/or communication with an external planning and/or monitoring system. The wireless communication system 30 may comprise a GPS system with or without a differential correction system and/or a local positioning system, e.g. a local positioning system in communication with one or more local beacons arranged on one or more working areas 1a, 1b.

In an embodiment, the robot system 24 may further comprise an input unit 32 connected to the path planning module 26 and arranged for inputting parameters needed for autonomous control of the vehicle 22. In an embodiment the input unit 32 may be configured for inputting a working area 1a, 1b to work on, an outer boundary 2, 2a, an inner boundary 4, 4b, a direction parameter, an angle parameter ($\alpha$, $\beta$), and, optionally, a start point 12, 12a and an end point 14, 14a.

In an embodiment, the input unit 32 is a console interface (e.g. input screen etc.) mounted on the vehicle 22, thus allowing localised inputting parameters at the vehicle 22. In a further embodiment, the input unit 32 is connected wirelessly to an external input system via the wireless communication system 30, thereby allowing external input remote from the vehicle 22 so that the robot system 24 is remotely provided with necessary data for executing the method as disclosed above.

In summary, the robot system 24 and in particular the path planning module 26 and control unit 30 thereof are configured for a) determining an outer boundary 2 and an inner boundary 4 of a working area 1a for the vehicle 22 to operate on, b) providing a direction parameter indicating a primary working direction 6 along which the working area 1a is to be worked on by the vehicle 22, and providing an angle parameter indicating an angle α, β, between a secondary working direction 8 and the primary working direction 6, wherein the secondary working direction 8 indicates a direction along which a plurality of working paths 10 are to be arranged within the inner boundary 4. The robot system 24 may in an embodiment further allow for selecting a starting point 12 and an end point 14 for the vehicle. The path planning module 26 of the robot system 24 is then configured for d) calculating the plurality of working paths 10 within the inner boundary 4 based on the direction parameter and e) further calculating one or more connecting paths 16 between the outer boundary 2 and the inner boundary 4, wherein each connecting path 16 connects two subsequent working paths 10. In an embodiment the robot system 24 may be further configured for calculating an intermediate path 20 connecting the working area 1a and a further working area 1b for the vehicle to work on autonomously. The robot system 24 may allow the one or more working tools fitted to the vehicle to be activated or disabled.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method of autonomous path planning for a vehicle, comprising the steps of
    a) determining an outer boundary and an inner boundary of a working area for a vehicle to operate on,
    b) providing a direction parameter indicating a primary working direction along which the working area is to be worked on by the vehicle;
    c) providing an angle parameter indicating an angle between a secondary working direction and the primary working direction, the secondary working direction indicating a direction along which a plurality of working paths are to be arranged within the inner boundary;
    d) calculating the plurality of working paths within the inner boundary based on the direction parameter and the angle parameter; and
    e) further calculating one or more connecting paths between the outer boundary and the inner boundary, each connecting path connecting two subsequent working paths and, based on the available connecting space, calculating a straight connecting path, an Omega-turn connecting path, a two-point turn connecting path comprising reverse vehicle motion, or a four-point turn connecting path comprising reverse vehicle motion.

2. The method of claim 1, further comprising the step of calculating a trimming path along at least a part of the inner boundary.

3. The method of claim 2, wherein the method step of calculating the trimming path comprises calculating the trimming path along a closed inner boundary in clockwise or counter clockwise fashion.

4. The method of claim 2, wherein the method step of calculating the trimming path comprises calculating the trimming path at an offset trimming distance from the inner boundary.

5. The method of claim 1, wherein the method step of e) further calculating one or more connecting paths comprises
    determining for a connecting path of the one or more connecting paths one or more candidate connecting paths each having an associated penalty score, and
    selecting a candidate connecting path having a lowest penalty score; and
    applying the selected candidate connecting path as the calculated connecting path of the one or more connecting paths.

6. The method of claim 5, further comprising defining the lowest penalty score based on inner boundary crossing and outer boundary crossing by the vehicle, wherein inner boundary crossing has a higher penalty score or lower penalty score than a penalty score of outer boundary crossing.

7. The method of claim 1, wherein the method steps of d) calculating the plurality of working paths and/or e) further calculating the one or more connecting paths further comprises avoiding one or more predefined obstacles or one or more dynamically detected obstacles.

8. The method of claim 1, wherein the method steps of d) calculating the plurality of working paths and/or e) further calculating one or more connecting paths comprises calculating a working offset distance from a working path of the plurality of working paths and/or a connection offset distance from a connecting path of the one or more connecting paths.

9. The method of claim 1, wherein the method further comprises calculating an intermediate path connecting the working area and a further working area for the vehicle to work on autonomously.

10. The method of claim 1, wherein the method steps of d) calculating the plurality of working paths and e) further calculating one or more connecting paths are performed by the autonomous vehicle and/or by an external planning system.

11. The method of claim 1, wherein the method step of c) providing an angle parameter comprises providing an angle between 0 and 360° degrees.

12. The method of claim 1, wherein the method steps of d) calculating the plurality of working paths and/or e) further calculating one or more connecting paths are based on global positioning information with or without differential corrections or local positioning information supplied by one or more local beacons on the working area and/or one or more vision based systems.

13. The method of claim 1, wherein the method steps of d) calculating the plurality of working paths and/or e) further calculating one or more connecting paths comprises calculating and/or selecting optimal curvature algorithms.

14. A robot system for controlling a vehicle, comprising a control unit fitted on a vehicle and a path planning module, the path planning module interfacing with the control unit, one or more vehicle actuators and one or more vehicle sensors, and wherein the path planning module and control unit are configured for autonomous engagement with the one or more vehicle actuators and the one or more vehicle sensors of the vehicle by
a) determining an outer boundary and an inner boundary of a working area for a vehicle to operate on,
b) providing a direction parameter indicating a primary working direction along which the working area is to be worked on by the vehicle;
c) providing an angle parameter indicating an angle between a secondary working direction and the primary working direction, the secondary working direction indicating a direction along which a plurality of working paths are to be arranged within the inner boundary;
d) calculating the plurality of working paths within the inner boundary based on the direction parameter and the angle parameter; and
e) further calculating one or more connecting paths between the outer boundary and the inner boundary, each connecting path connecting two subsequent working paths, and based on the available connecting space, calculating a straight connecting path, an Omega-turn connecting path, a two-point turn connecting path comprising reverse vehicle motion, or a four-point turn connecting path comprising reverse vehicle motion.

* * * * *